United States Patent
Ito et al.

(10) Patent No.: US 9,172,755 B2
(45) Date of Patent: Oct. 27, 2015

(54) REMOTE INFORMATION COLLECTING DEVICE AND COMPUTER READABLE MEDIUM

(75) Inventors: Toshio Ito, Kawasaki (JP); Yu Kaneko, Yokohama (JP); Shigeo Matsuzawa, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 863 days.

(21) Appl. No.: 13/336,406

(22) Filed: Dec. 23, 2011

(65) Prior Publication Data

US 2012/0254350 A1 Oct. 4, 2012

(30) Foreign Application Priority Data

Mar. 28, 2011 (JP) ................................ 2011-070771

(51) Int. Cl.
| | |
|---|---|
| *G06F 15/16* | (2006.01) |
| *H04L 29/08* | (2006.01) |
| *H04L 12/28* | (2006.01) |
| *G06F 15/173* | (2006.01) |
| *H04Q 5/22* | (2006.01) |
| *G06F 3/00* | (2006.01) |
| *G08C 19/16* | (2006.01) |
| *H04J 3/02* | (2006.01) |

(52) U.S. Cl.
CPC .......... *H04L 67/125* (2013.01); *H04L 12/2809* (2013.01); *H04L 12/2825* (2013.01); *H04L 67/12* (2013.01); *H04L 67/325* (2013.01)

(58) Field of Classification Search
CPC G01D 4/004; H04L 12/2825; H04L 12/2861; H04L 41/5029; H04L 43/06
USPC ......... 709/217, 224; 340/10.1, 870.2; 710/58; 370/462
See application file for complete search history.

(56) References Cited

U.S. PATENT DOCUMENTS

| | | | | |
|---|---|---|---|---|
| 5,862,411 | A * | 1/1999 | Kay et al. ........................ | 710/58 |
| 6,970,183 | B1 * | 11/2005 | Monroe ........................ | 348/143 |
| 2005/0243605 | A1 * | 11/2005 | Kaneko ..................... | 365/185.22 |

(Continued)

FOREIGN PATENT DOCUMENTS

| | | |
|---|---|---|
| JP | 2000-259520 | 9/2000 |
| JP | 2004-104753 | 4/2004 |

(Continued)

OTHER PUBLICATIONS

Office Action dated Jan. 11, 2013 in JP Application No. 2011-070771 with English-language translation.

*Primary Examiner* — David Lazaro
*Assistant Examiner* — Vitali Korobov
(74) *Attorney, Agent, or Firm* — Nixon & Vanderhye, P.C.

(57) ABSTRACT

A building-facility information storage stores data sizes of process data to be collected from building-side communicating devices. A schedule generating unit generates a collection schedule of the process data from the building-side communicating devices so that, in a collection period including a plurality of unit periods continuous in terms of time, a first communication load representing a total data volume received from the building-side communicating devices per unit period and second communication loads each representing a data volume transmitted from each of the building-side communicating devices per unit period are balanced among the unit periods. A network communicating unit collects the process data from the building-side communicating devices in accordance with the collection schedule.

14 Claims, 14 Drawing Sheets

(56) References Cited

U.S. PATENT DOCUMENTS

| | | |
|---|---|---|
| 2005/0270173 A1* | 12/2005 | Boaz .................... 340/870.02 |
| 2009/0070454 A1* | 3/2009 | McKinnon et al. ........... 709/224 |
| 2009/0146839 A1* | 6/2009 | Reddy et al. ............ 340/870.02 |
| 2009/0213871 A1* | 8/2009 | Carlson et al. ................ 370/462 |
| 2009/0281819 A1* | 11/2009 | Garg ................................ 705/1 |
| 2009/0303009 A1* | 12/2009 | Itasaki et al. ................. 340/10.1 |
| 2009/0322556 A1* | 12/2009 | Cook et al. .............. 340/870.02 |
| 2010/0165920 A1* | 7/2010 | Chen ............................. 370/328 |
| 2010/0188257 A1* | 7/2010 | Johnson .................. 340/870.02 |
| 2011/0004764 A1* | 1/2011 | Stuber ........................... 713/176 |
| 2011/0066758 A1 | 3/2011 | Maegawa et al. |

FOREIGN PATENT DOCUMENTS

| | | |
|---|---|---|
| JP | 2004-297646 | 10/2004 |
| JP | 2006-325138 | 11/2006 |
| JP | 2009-016889 | 1/2009 |
| JP | 2011-066623 | 3/2011 |

* cited by examiner

INTERNAL CONFIGURATION OF BUILDING-FACILITY-INFORMATION STORAGE

| DATA IDENTIFIER | IDENTIFIER OF BUILDING-SIDE COMMUNICATING DEVICE | DATA SIZE | ACQUISITION CYCLE | RESPONSE TIME |
|---|---|---|---|---|
| 1 | BUILDING A DEVICE a | 3kB | 5 MINUTES | 5 SECONDS |
| 2 | BUILDING A DEVICE a | 4kB | 3 MINUTES | 5 SECONDS |
| 3 | BUILDING A DEVICE a | 2kB | 3 MINUTES | 10 SECONDS |
| 4 | BUILDING B DEVICE b | 5kB | 5 MINUTES | 30 SECONDS |
| 5 | BUILDING B DEVICE b | 3kB | 2 MINUTES | 40 SECONDS |
| 6 | BUILDING B DEVICE b | 10kB | 10 MINUTES | 60 SECONDS |
| 7 | BUILDING B DEVICE b | 2kB | 2 MINUTES | 10 SECONDS |
| ⋮ | ⋮ | ⋮ | ⋮ | ⋮ |

FIG. 3

INFORMATION-COLLECTING-DEVICE COMMUNICATION-SCHEDULE STORAGE 108

| STARTING TIME | ENDING TIME | DATA IDENTIFIER LIST | COMMUNICATION LOAD | PERMISSIBLE COMMUNICATION LOAD |
|---|---|---|---|---|
| 0 MINUTES | 1 MINUTE | 1, 5 | 6kB | 5MB |
| 1 MINUTE | 2 MINUTES | 2, 4, 7 | 11kB | 5MB |
| 2 MINUTES | 3 MINUTES | 3, 5 | 5kB | 5MB |
| 3 MINUTES | 4 MINUTES | 6, 7 | 12kB | 5MB |
| 4 MINUTES | 5 MINUTES | 2, 5 | 7kB | 5MB |
| 5 MINUTES | 6 MINUTES | 1, 3, 7 | 7kB | 5MB |
| ... | ... | ... | ... | ... |

FIG. 4

BUILDING-SIDE COMMUNICATING-DEVICE COMMUNICATION-SCHEDULE STORAGE 107

| STARTING TIME | ENDING TIME | DATA IDENTIFIER LIST | COMMUNICATION LOAD | PERMISSIBLE COMMUNICATION LOAD |
|---|---|---|---|---|
| 0 MINUTES | 1 MINUTE | 1 | 3kB | 400kB |
| 1 MINUTE | 2 MINUTES | 2 | 4kB | 400kB |
| 2 MINUTES | 3 MINUTES | 3 | 2kB | 400kB |
| 3 MINUTES | 4 MINUTES |  | 0 | 400kB |
| 4 MINUTES | 5 MINUTES | 2 | 4kB | 400kB |
| 5 MINUTES | 6 MINUTES | 1,3 | 5KB | 400kB |
| ... | ... | ... | ... | ... |

※ SCHEDULE WITH RESPECT TO BUILDING A DEVICE a

FIG. 5

DATA-REQUEST TRANSMITTING-SCHEDULE STORAGE

| TRANSMISSION TIME | IDENTIFIER LIST OF REQUESTED DATA |
|---|---|
| 0 | 1 |
| 10 SECONDS | 5 |
| 20 SECONDS | |
| 30 SECONDS | |
| 40 SECONDS | |
| 50 SECONDS | 4 |
| 1 MINUTE | 7 |
| 1 MINUTE 10 SECONDS | 2 |
| 1 MINUTE 20 SECONDS | |
| 1 MINUTE 30 SECONDS | 5 |
| 1 MINUTE 40 SECONDS | |
| 1 MINUTE 50 SECONDS | |
| 2 MINUTES | 3 |
| 2 MINUTES 10 SECONDS | 6 |
| . . . | . . . |

FIG. 6

| DATA IDENTIFIER | IDENTIFIER OF BUILDING-SIDE COMMUNICATING DEVICE | DATA SIZE | ACQUISITION CYCLE | RESPONSE TIME | DEPENDED DATA IDENTIFIER | RELATIVE TIME |
|---|---|---|---|---|---|---|
| 1 | BUILDING A DEVICE a | 3kB | 5 MINUTES | 20ms | NULL | — |
| 2 | BUILDING A DEVICE b | 4kB | 5 MINUTES | 50ms | 1 | 1 MINUTE |
| 3 | BUILDING B DEVICE a | 5kB | 3 MINUTES | 100ms | NULL | — |
| 4 | BUILDING A DEVICE c | 10kB | 5 MINUTES | 60ms | 2 | 0 |
| ... | ... | ... | ... | ... | ... | ... |

FIG. 11

| BUILDING-FACILITY CHAIN IDENTIFIER | BUILDING-FACILITY CHAIN CYCLE | DATA IDENTIFIER | RELATIVE TIME |
|---|---|---|---|
| 1 | 5 MINUTES | 1 | 0 |
| 1 | 5 MINUTES | 2 | 1 MINUTE |
| 1 | 5 MINUTES | 4 | 1 MINUTE |
| ⋮ | ⋮ | ⋮ | ⋮ |
| 2 | 3 MINUTES | 3 | 0 |
| ⋮ | ⋮ | ⋮ | ⋮ |

FIG. 12

REMOTE INFORMATION COLLECTING DEVICE AND COMPUTER READABLE MEDIUM

CROSS REFERENCE TO RELATED APPLICATIONS

This application is based upon and claims the benefit of priority from the prior Japanese Patent Application No. 2011-70771, filed on Mar. 28, 2011, the entire contents of which are incorporated herein by reference.

FIELD

An embodiment of the present invention relates to a remote information collecting device that collect information of many building facilities at remote locations via a network, and a computer readable medium storing a computer program therefore.

BACKGROUND

Various facilities such as lighting, air-conditioning, and disaster preventing facilities are installed in buildings. In order to realize controlling these facilities from the inside or outside of the buildings or monitoring if abnormalities have occurred or not, a device and a system that remotely collect working information (process data) of the building facilities over a network have been proposed. In such a system, the process data are transferred via a network between an information collecting device and building-side communicating devices, which are connected to the building facilities of interest to collect information from them. The process data are generally collected at a certain determined time cycle, because such data are easier to utilize than data collected irregularly.

When the building facilities the system collects information from are increased, the communication traffic between the building-side communicating devices and the information collecting device is increased. When the communication traffic is increased to the extent close to a communication bandwidth, problems such as loss of the data communicated over the network and increase in the delay generated in process data acquisition occur. Therefore, there has been proposed a method in which the cycle to acquire the process data is determined in accordance with the communication bandwidth or importance of the facility information. For example, a long acquisition cycle is set for a building-side communicating device having a small communication bandwidth.

According to this method, an average volume of the communication traffic can be limited to a predetermined value by adjusting the acquisition cycle. However, in this method, the time to acquire the process data is not controlled; therefore, large communication load may be momentarily generated on the information collecting device or the building-side communicating device. For example, even in the case in which the acquisition cycle of the process data is sufficiently large, if the information collecting device attempts to acquire data from many building facilities at the same time, communication load that exceeds the communication bandwidth or processing ability of the information collecting device can be momentarily generated.

In order to solve these problems, there has been proposed a method in which the time to carry out communication is determined in advance for each of building-side communicating devices. In this method, the acquisition cycle of the process data is divided into certain unit periods. A communication event between the building-side communicating devices and the information collecting device is assigned to one of these unit periods. When such a method is employed, an upper limit can be set for the number of the building-side communicating devices that communicate within the unit period; therefore, momentary traffic concentration at the information collecting device can be prevented.

However, in this method, the communication load applied to the building-side communicating devices is not controlled. Therefore, even though the concentration of the communication load on the information collecting device can be prevented, the possibility of the momentary occurrence of excessive communication load for the building-side communicating devices is still remaining.

As described above, when the process data are to be collected at a constant cycle, excessively large communication load may be concentrated on the information collecting device or the building-side communicating device. The concentration of the communication load applied only to the information collecting device can be prevented; however, a device or a system capable of preventing the communication load concentration both on the information collecting device and the building-side communicating device is not present.

BRIEF DESCRIPTION OF THE DRAWINGS

FIG. 3 shows a table of building-facility information stored in a building-facility-information storage in the first embodiment;

FIG. 4 shows a table of a communication schedule stored in a communication-schedule storage for the information collecting device in the first embodiment;

FIG. 5 shows a table of a communication schedule stored in a communication-schedule storage for each building-side communicating device in the first embodiment;

FIG. 6 shows a data-request transmitting schedule stored in a data-request transmitting-schedule storage in the first embodiment;

FIG. 11 shows a table of building-facility information stored in a building-facility-information storage in the second embodiment;

FIG. 12 shows a building-facility chain table stored in a building-facility chain storage in the second embodiment;

DETAILED DESCRIPTION

According to an embodiment of the present invention, there is provided a remote information collecting device which sequentially collects one or more process data from each of a plurality of building-side communicating devices.

The remote information collecting device includes a building-facility information storage, a schedule generating unit and a network communicating unit.

The building-facility information storage stores data sizes of the process data to be collected from the building-side communicating devices.

The schedule generating unit generates a collection schedule of the process data from the building-side communicating devices so that, in a collection period including a plurality of unit periods continuous in terms of time, a first communication load representing a total data volume received from the building-side communicating devices per unit period and second communication loads each representing a data volume transmitted from each of the building-side communicating devices per unit period are balanced among the unit periods.

The network communicating unit collects the process data from the building-side communicating devices in accordance with the collection schedule.

Hereinafter, embodiments of the present invention will be explained based on drawings.

First Embodiment

Figure 1:
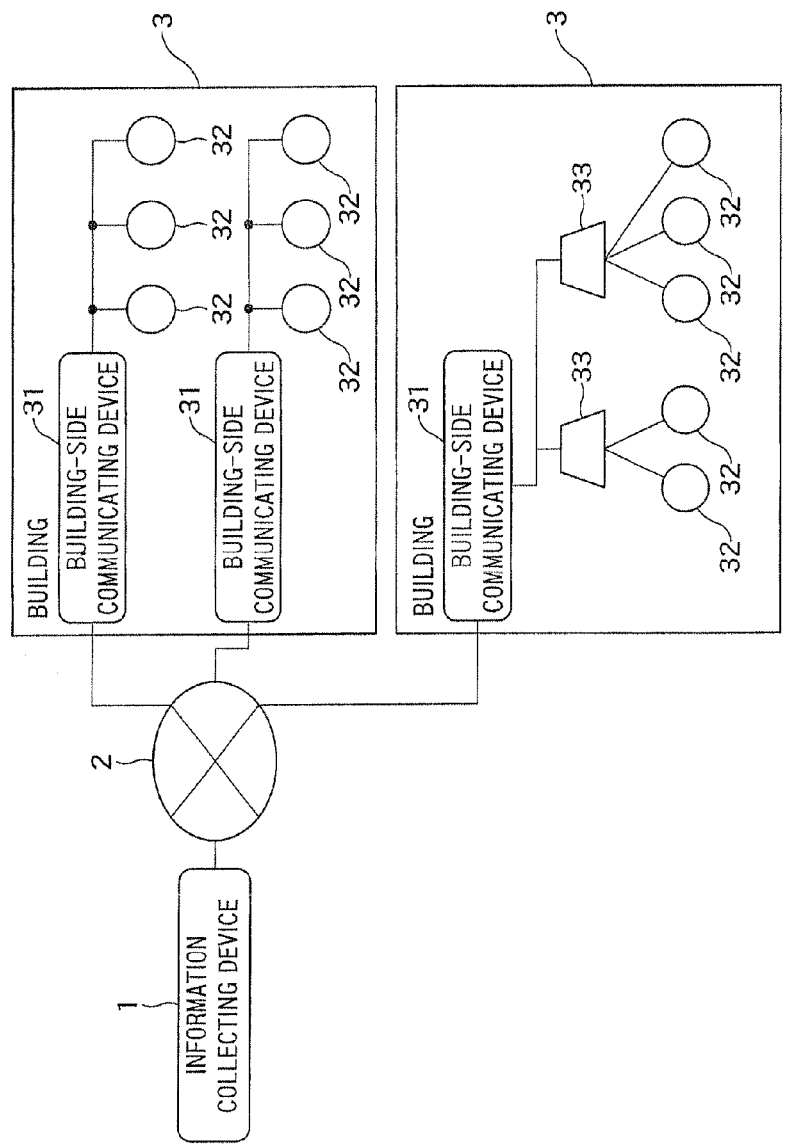
FIG. 1 is a schematic configuration drawing of an entire remote information collecting system.

FIG. 1 is a drawing showing an outline of a remote information collecting system of a first embodiment of the present invention. In this system, an information collecting device 1 collects process data, which are possessed by building facilities 32 in buildings 3 serving as monitoring targets, through a network 2. One or a plurality of building-side communicating devices 31 are present in the building 3 and directly communicate with the information collecting device 1 through the network 2. Each of the building-side communicating devices 31 controls some of the building facilities 32. The building facilities 32 are directly connected to the building-side communicating device 31 in some cases or are connected to the building-side communicating device 31 via one or a plurality of building-facility intermediate controlling devices 33 in some other cases. When the building-side communicating device 31 receives from the information collecting device 1 a request for process data of the building facility 32, which is controlled by the building-side communicating device 31, the building-side communicating device 31 returns the corresponding process data to the information collecting device 1. The process data transmitted by the building-side communicating device 31 may be acquired by making an inquiry directly to the building facility 32 after the process data request is received from the information collecting device 1, or process data stored in advance in a database provided in the building-side communicating device 31 may be used.

Figure 2:
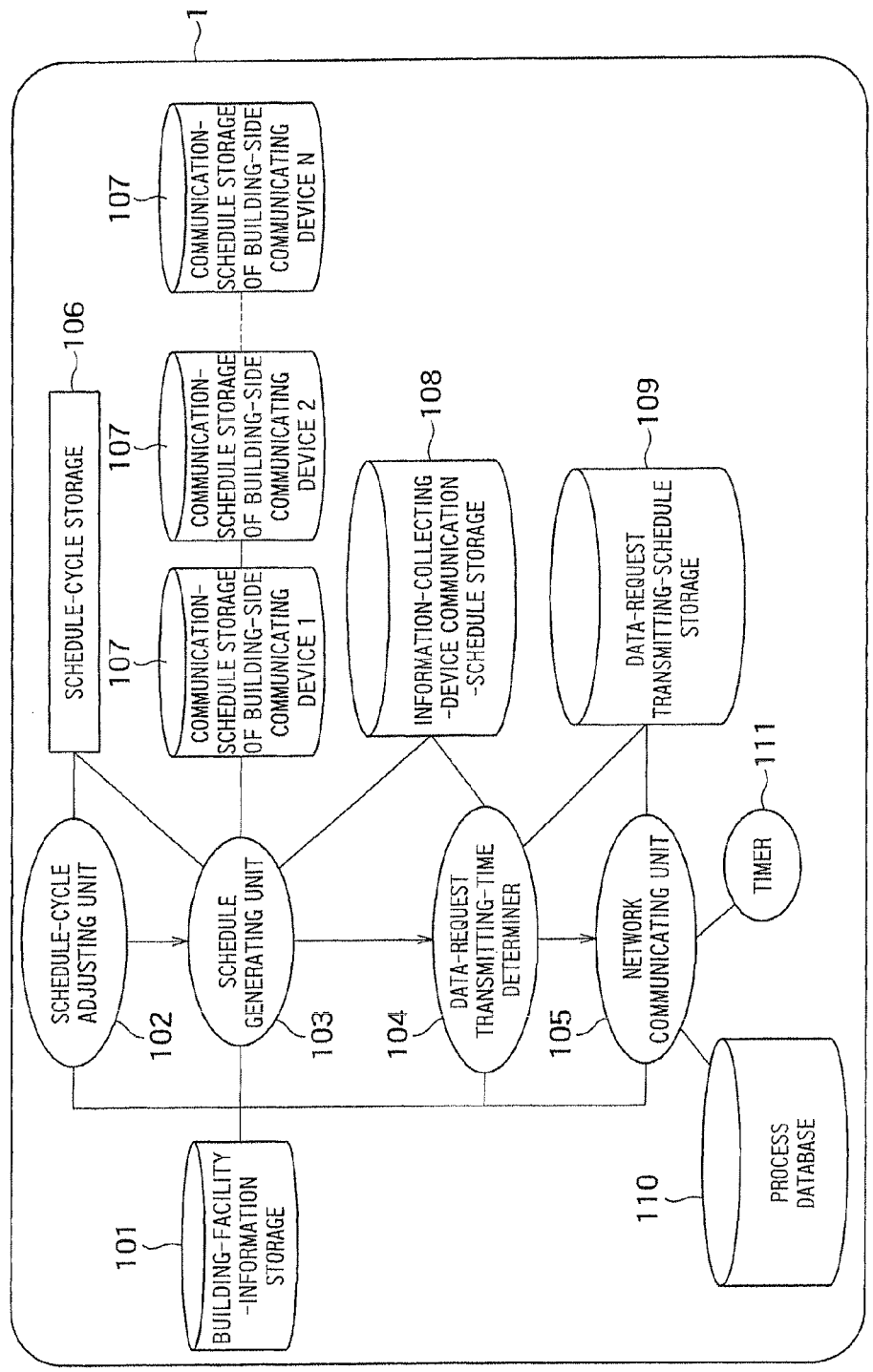
FIG. 2 is an internal configuration drawing of an information collecting device in a first embodiment.

FIG. 2 shows an internal configuration of the information collecting device 1. The information collecting device 1 has: a building-facility-information storage 101, a schedule-cycle adjusting unit 102, a schedule generating unit 103, a data-request transmitting-time determiner 104, a network communicating unit 105, a schedule-cycle storage 106, building-side communicating-device communication-schedule storages 107, an information-collecting-device communication-schedule storage 108, a data-request transmitting-schedule storage 109, a process database 110, and a timer 111. In order to prevent excessive communication load from being applied to the information collecting device 1 and each of the building-side communicating devices 31, first, the information collecting device 1 generates a collection schedule which describes when to collect (receive) process data of the building facilities 32. The information collecting device 1 transmits data requests to the building-side communicating devices 31 in accordance with the generated collection schedule and receives the process data.

The building-facility-information storage 101 stores information about the building facilities 32 serving as the collecting targets. All the information necessary for generating a process-data collection schedule is retained by the building-facility-information storage 101. FIG. 3 shows an example of the information stored in the building-facility-information storage 101. Unique data identifiers are imparted to the process data of the building facilities 32 serving as the collecting targets. As shown in FIG. 3, for each process data, information such as a unique identifier of the building-side communicating device 31 controlling the corresponding building facility 32, the size of the process data, a cycle to acquire the process data, and response time of the building-side communicating device 31 with respect to the inquiry of the process data is stored in the building-facility-information storage 101. This information is referenced, for example, when the schedule-cycle adjusting unit 102 or the schedule generating unit 103 generates the collection schedule and when the network communicating unit 105 communicates with the building-side communicating device 31.

The schedule-cycle storage 106 stores a schedule cycle. The schedule cycle is a time cycle of the collection schedule generated by the information collecting device 1. In the collection schedule, the time for acquiring each process data within the schedule cycle is described. When the network communicating unit 105 actually carries out the collection, a process data acquiring process described in the collection schedule is repeated for each schedule cycle. Each period of each schedule cycle corresponds to a collection period.

The schedule-cycle adjusting unit 102 references the acquisition cycle of each process data stored in the building-facility-information storage 101 and adjusts the schedule cycle stored in the schedule-cycle storage 106. Specifically, the schedule cycle is adjusted so that it becomes a common multiple of all of process data acquisition cycles. For example, if there are three acquisition cycles of the process data stored in the building-facility-information storage 101, i.e., 2 minutes, 3 minutes, and 5 minutes, the schedule cycle is adjusted to be a multiple of 30 minutes. As a result, even in the case in which the process data having an arbitrary acquisition cycle are in the building-facility-information storage 101, a schedule capable of including those data can be generated.

The building-side communicating-device communication-schedule storages 107 are prepared respectively for the building-side communicating devices 31 serving as the targets of information collection and store for each time point: a gathering of the process data collected by the building-side communicating devices 31, information of communication load expected to be generated thereby, and maximum permissible communication load. The information-collecting-device communication-schedule storage 108 stores similar information for the information collecting device 1. The data stored in the building-side communicating-device communication-schedule storage 107 and the information-collecting-device communication-schedule storage 108 has a common format.

An example of the information stored in the building-side communicating-device communication-schedule storage 107 is shown in FIG. 5. In the table of FIG. 5, each row shows a certain period of time in the collection schedule. For example, a second row of the table of FIG. 5 represents a period of time from the point immediately after the schedule cycle is started (0 minutes) until 1 minute thereafter. Herein, the time shown in the columns of "starting time" and "ending time" of the table of FIG. 5 represents relative time starting from the starting time of the cycle of the collection schedule. In the present embodiment, the absolute starting time of the cycle of the collection schedule may be arbitrary time, and the time to collect each process data is determined within the collection schedule cycle. Other columns of the table of FIG. 5 include lists of identifiers of the process data to be collected in those periods of time, communication load generated upon collection of the process data, and information of maximum communication load permissible in those periods of time. Note that, in this example, the communication load is expressed as a total of the number of the bytes of the process data. The permissible communication load (corresponding to a second permissible communication load) is a maximum data volume which is permitted to be transmitted from the building-side communicating device 32 per unit period (herein, 1 minute). The permissible communication load is set in advance.

An example of the information stored in the information-collecting-device communication-schedule storage 108 is shown in FIG. 4. A schedule of all of the process data collected by the information collecting device 1 and the communication load applied to the information collecting device 1 are stored. On the other hand, in the building-side communicating-device communication-schedule storage 107, only a schedule of the process data controlled by the corresponding building-side communicating device 31 and the communication load applied to the corresponding building-side communicating device 31 are stored. The permissible communication load (corresponding to a first permissible communication load) is a maximum total data volume permitted to be received from the building-side communicating devices per unit period (herein, one minute). The permissible communication load is set in advance.

The schedule generating unit 103 references the information stored in the building-side communicating-device communication-schedule storages 107 and the information-collecting-device communication-schedule storage 108 and determines the process-data acquisition times of the building facilities 32 stored in the building-facility-information storage 101. In that process, the schedule generating unit 103 sets the acquisition times of the process data so that the communication load applied to the building-side communicating devices 31 and the information collecting device 1 is balanced in terms of time and does not exceed the set permissible communication load. In other words, the acquisition times of the process data are set so that the total data volume (first communication load) received by the information collecting device 1 in a unit period (herein, 1 minute) and the data volume (second communication load) transmitted by each of the building-side communicating devices 31 per unit period are balanced among unit periods.

By virtue of this, the communication load is prevented from concentrating in a particular time period with respect to both the building-side communicating devices 31 and the information collecting device 1, and the communication load that is not permissible is prevented from being applied to the devices. If the acquisition time that prevents the excess over the set permissible communication load cannot be found by any possibility, the schedule generating unit 103 stops generating the schedule and reports an error to an administrator of the information collecting device 1. When the acquisition time of the process data is determined, the schedule generating unit 103 adds an identifier of the corresponding process data to the information-collecting-device communication-schedule storage 108 and the building-side communicating-device communication-schedule storage 107 which controls the corresponding process data.

The data-request transmitting-schedule storage 109 stores a data-request transmitting schedule. The data-request transmitting schedule is the information describing that the inquiry of which process data is to be transmitted at which time in the schedule cycle. FIG. 6 shows an example of the data-request transmitting schedule. In the table of FIG. 6, each row represents each transmission time, and a list of the identifier(s) of the process data to be inquired at each transmission time is stored in each row. The time shown in the column of the transmission time of the table of FIG. 6 represents relative time starting from the starting time of the collection schedule cycle.

The data-request transmitting-time determiner 104 references the process-data collection schedule stored in the information-collecting-device communication-schedule storage 108, generates the data-request transmitting schedule, and stores that in the data-request transmitting-schedule storage 109. As shown in FIG. 4, the time periods during which the process data are to be received are described in the collection schedule. However, the response time taken from when the information collecting device 1 transmits a request packet of the process data until the corresponding process data is actually received is different for each of the building-side communicating devices 31 and the building facilities 32. Therefore, the data-request transmitting-time determiner 104 references the information of the response time of the process data stored in the building-facility-information storage 101 and calculates the data-request transmitting schedule backward from the collection schedule. In the present embodiment, the information of the response time represents the response time per se; however, the information is not limited to that as long as it is the information by which the response time can be specified, and the information may be, for example, a half value of the response time.

The network communicating unit 105 transmits request packets of the process data to the appropriate building-side communicating devices 31 in accordance with the data-request transmitting schedule while referencing time information obtained from the timer 111. The transmission destinations of the request packets of the process data are derived by referencing the building-facility-information storage 101 by using the identifiers of the requested process data. When the process data are received from the building-side communicating devices 31, the network communicating unit 105 saves the data in the process database 110.

The process database 110 stores the process data the network communicating unit 105 received from the building-side communicating devices 31. In the present embodiment, the process database 110 is contained in the information collecting device 1; however, a configuration in which the process database 110 is contained in a device different from the information collecting device 1 may be employed.

The timer 111 provides information of accurate current time to the network communicating unit 105. The timer 111 is reset in accordance with an instruction from the network communicating unit 105 and notifies the network communicating unit 105 of the time elapsed from last reset time.

Figure 7:
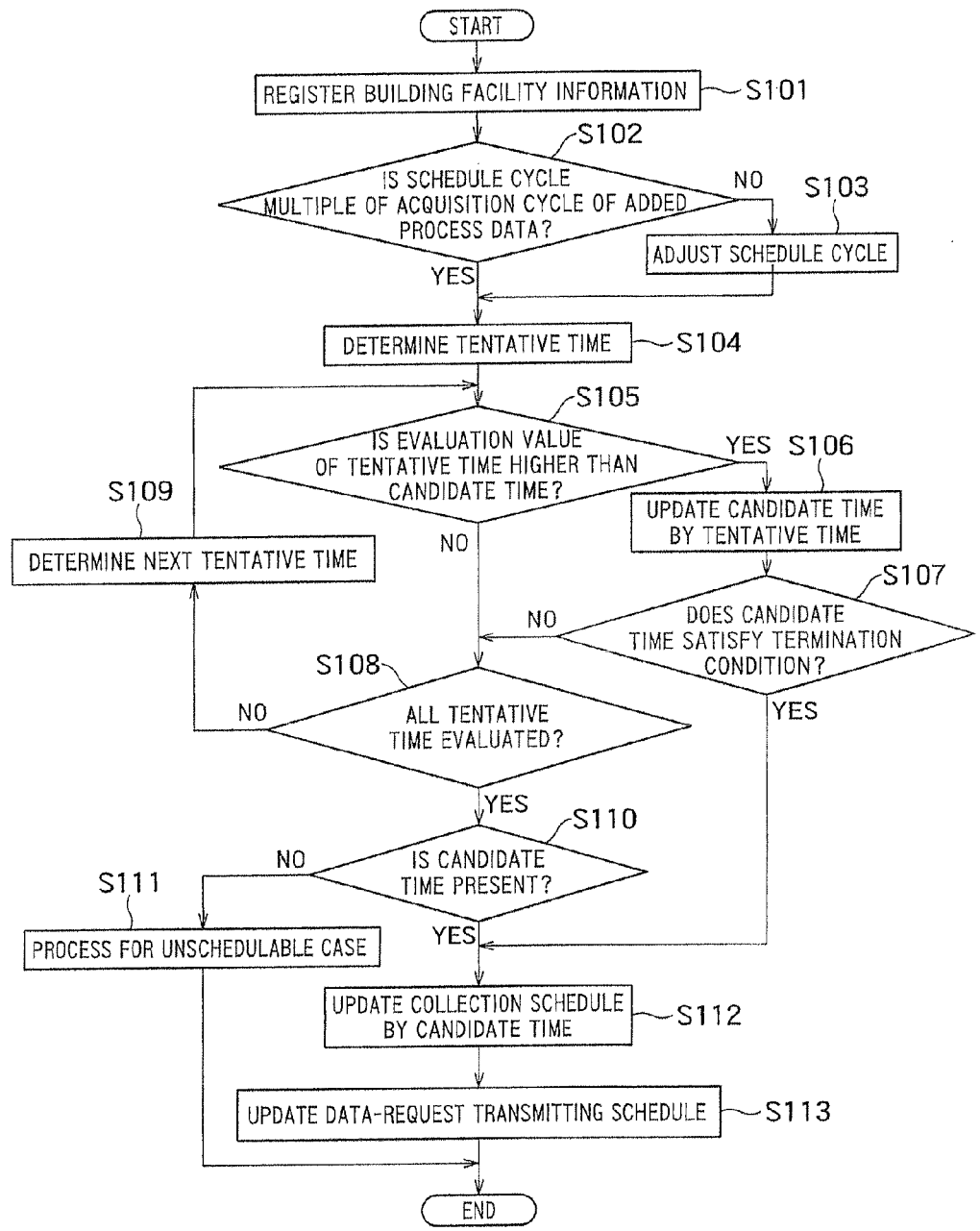
FIG. 7 is a flow chart for explaining an operation of the information collecting device in the case in which a new building facility is to be added to the schedule in the first embodiment.

Next, an operation of the information collecting device 1 of the present embodiment will be explained by using a flow chart of FIG. 7. The flow chart shows the operation of the case in which a new building facility 32 is added to a building already serving as a collecting target and process data thereof is to be added to the collection schedule.

First, information about the added new building facility 32 is additionally registered in the building-facility-information storage 101 (step S101). The information added herein is provided by an administrator of the corresponding building 3 or obtained by measuring by the administrator of the information collecting device 1 under cooperation of the administrator of the corresponding building 3.

Then, the schedule-cycle adjusting unit 102 references the information of the added building facility and the schedule cycle and checks whether the schedule cycle is a multiple of the acquisition cycle of the process data which is to be newly collected (step S102).

If the schedule cycle is not a multiple of the acquisition cycle of the added process data, the schedule-cycle adjusting unit 102 adjusts the schedule cycle so that the schedule cycle becomes a multiple of the acquisition cycle of the added process data (step S103). This step can be carried out, for example, by setting a new schedule cycle to be the least common multiple of the acquisition cycle of the added process data and the previous schedule cycle. Upon adjustment of the schedule cycle, the collection schedules saved in the building-side communicating-device communication-schedule storage 107 and the information-collecting-device communication-schedule storage 108 are extended so that collection schedules according to the new schedule cycle are expressed. For example, in the case in which the previous schedule cycle is 3 minutes and the acquisition cycle of the added process data is 2 minutes, the new schedule cycle is changed to 6 minutes, and the length of the previous collection schedule is extended to be two times.

When the adjustment of the schedule cycle is finished, the schedule generating unit 103 determines tentative time (step S104). The tentative time is tentatively-set acquisition time of the process data. An initial value of the tentative time set herein can be randomly selected from the time within the acquisition cycle of the corresponding process data.

The schedule generating unit 103 in the present embodiment changes the tentative time and, at the same time, evaluates the communication load applied to the building-side communicating device 31 and the information collecting device 1 when the process data is scheduled at the tentative time. Among the examined tentative time, the tentative time that provides a high evaluation value is stored as candidate time. In step S105, whether the evaluation value of the communication load at provided tentative time is higher than the evaluation value of the candidate time or not is examined. If the evaluation value of the tentative time is higher, the candidate time is updated by the current tentative time (step S106). Note that, if the communication load at the provided tentative time exceeds the permissible communication load of either the building-side communicating device 31 or the information collecting device 1, the evaluation value thereof is undefined; and, even if no candidate time is present, this tentative time is not accepted as candidate time.

Various methods are conceivable as the method for calculating the evaluation value of the acquisition time of the process data. For example, there is a method that calculates the sum of increments in maximum values of the communication load applied to the information collecting device 1 and the building-side communicating device 31 which controls the corresponding process data, when the process data is scheduled at the tentative time. In this case, the smaller the sum of the increments of the communication load maximum values, the higher the evaluation value of the tentative time thereof. This method corresponds to causing a weighted total of the maximum value of the communication load applied to the information collecting device 1 (first communication load) and the maximum values of the communication loads applied to the building-side communicating devices 31 (second communication load) to be as small as possible (to be minimum or equal to or less than a threshold value). The weight with respect to the information collecting device 1 and the building-side communicating devices 31 may be equally 1, or the weight may be changed depending on the devices.

As another calculating method, there is a method that calculates the evaluation value based on a remaining communication capacity possessed by the information collecting device 1 and the building-side communicating device 31, in other words, the difference between the permissible communication load and the current communication load. In this case, the larger the remaining communication capacity, the higher the evaluation value. This method corresponds to causing a weighted total of a minimum value of the difference between the permissible communication load of the information collecting device (first permissible communication load) and the above described first communication load and minimum values of the differences between the permissible communication load of the building-side communicating devices 31 (second permissible communication load) and the above described second communication loads to be maximum or equal to or higher than a threshold value.

If the candidate time is updated in step S106, whether the candidate time satisfies a termination condition of the acquisition time determining algorithm or not is examined (step S107). The termination condition is satisfied, for example, when the evaluation value of the communication load at the candidate time is theoretically the highest. Alternatively, in the case in which calculation resources of the information collecting device 1 is limited, the search may be interrupted when the number of times of the search for the tentative time reaches a certain upper limit, wherein the termination condition is considered to be satisfied. When the termination condition is satisfied, no further search for the tentative time is carried out. As a result, the calculation complexity necessary for scheduling can be reduced.

If the evaluation value of the tentative time does not exceed the evaluation value of the candidate time in step S105 or if the candidate time does not satisfy the termination condition in step S107, whether all the tentative time within the process data acquisition cycle has been evaluated or not is determined (step S108). If there is time that has not yet been evaluated, one time value is selected from among the unexamined time as a tentative time (step S109), and evaluation of the tentative time is carried out (return to step S105). There are several methods for determining the next tentative time in step S109. For example, unexamined tentative time is sequentially selected in an ascending order, or the tentative time is randomly selected from among the unexamined time.

If it is determined in step S108 that the evaluation of all the tentative time has been finished, whether the candidate time is present or not is examined (step S110). The case in which the candidate time is not present is the case in which the communication load applied to the information collecting device 1 or the building-side communicating device 31 when the corresponding process data is scheduled exceeds the permissible communication load at any of the tentative time. In that case, the corresponding process data cannot be incorporated into the schedule, and some kind of measure is required (step S111). Various methods are conceivable as the measure in this case. For example, the information collecting device 1 reports an error to the administrator thereof and urges the administrator to make a decision. The scheduling until this point has been carried out so as not to change the existing collection schedule; however, the existing collection schedule may be discarded at the point the process reaches step S111, and an attempt to re-generate the collection schedule about all the building facilities 32 stored in the building-facility-information storage 101 may be made. In any case, if the schedule that satisfies the permissible communication load of the information collecting device 1 and the building-side communicating device 31 cannot be generated regardless of the type of the attempt made by the information collecting device 1, an error is reported to the administrator. In that case, the administrator of the information collecting device 1 chooses/discards the building facilities 32 serving as the collection targets, expands the information collecting device 1, or consults the administrator of the building-side communicating device 31 or the administrators of the building 3 about measures.

If the candidate time satisfies the termination condition in step S107 or if the candidate time is present in step S110, this candidate time is employed to incorporate the process data into the schedule (step S112). In this process, in the tables of FIG. 5 and FIG. 4 stored in the building-side communicating-device communication-schedule storage 107 controlling the corresponding process data and the information-collecting-device communication-schedule storage 108, the rows corresponding to the candidate time and the time at an interval corresponding to an integral multiple of the process-data acquisition time cycle from the candidate time are updated. Specifically, the identifier of the corresponding process data is added to the column of the data identifier list in these rows, and the data size of the corresponding process data is added to the column of the communication load.

When the collection schedule information stored in the building-side communication-device communication-schedule storage 107 and the information-collecting-device communication-schedule storage 108 is updated, the data-request transmitting-time determiner 104 updates the data-request transmitting schedule stored in the data-request transmitting-schedule storage 109 (step S113). The data-request transmitting-time determiner 104 references the building-facility-information storage 101, retrieves the response time of the added process data, and subtracts the response time from the acquisition time of the process data added to the collection schedule, thereby calculating appropriate transmitting time to request the data. In the table of FIG. 6, update of the data-request transmitting schedule is carried out when the identifier of the corresponding process data is added to the rows corresponding to the calculated transmitting time.

Figure 8:
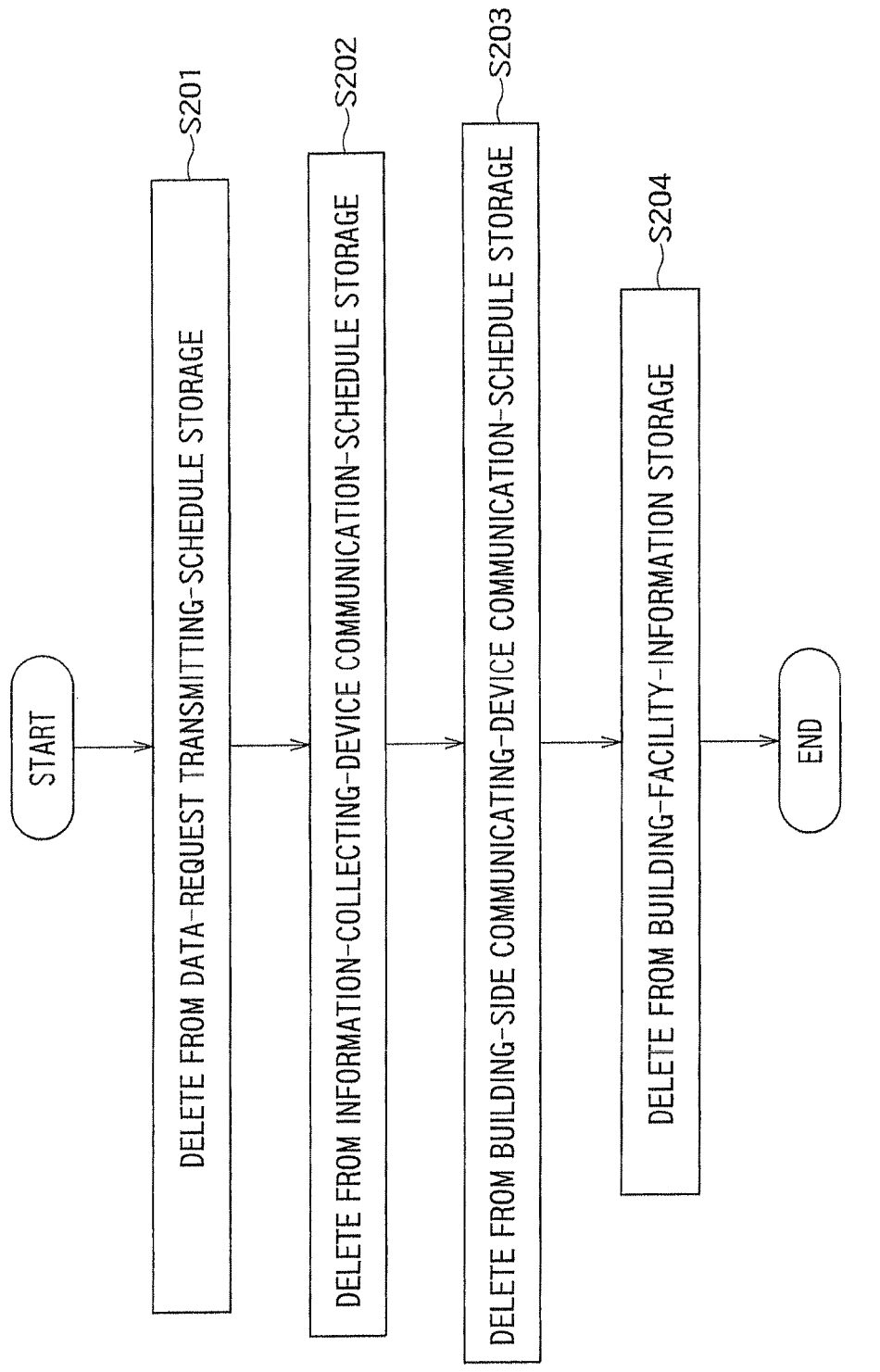
FIG. 8 is a flow chart for explaining an operation of the information collecting device when the building facility is to be deleted from the schedule in the first embodiment.

The operation in the case in which the new building facility 32 is added to the schedule has been explained above. FIG. 8 is a flow chart showing a flow of the operation in the case in which the scheduled building facility 32 is deleted from the schedule.

When the building facility 32 is to be deleted from the schedule, first, the corresponding building facility 32 is deleted from the data-request transmitting-schedule storage 109 (step S201). This can be carried out by deleting the data identifier of the corresponding building facility 32 from the table of FIG. 6.

Then, the corresponding building facility 32 is deleted from the information-collecting-device communication-schedule storage 108 (step S202). This can be carried out by deleting the data identifier of the corresponding building facility 32 from the table of FIG. 4. In this process, in the table of FIG. 4, the column of the communication load of the row from which the data identifier is deleted is also updated. Similarly, the corresponding building facility 32 is deleted also from the building-side communicating-device communication-schedule storage 107 (step S203). This can be carried out by deleting the data identifier of the corresponding building facility 32 from the table of FIG. 5. In this process, in the table of FIG. 5, the column of the communication load in the row from which the data identifier is deleted is also updated.

Lastly, the corresponding building facility 32 is deleted from the building-facility-information storage 101 (step S204). This is carried out by discarding the row corresponding to the data identifier of the corresponding building facility 32.

When the information of the scheduled building facility 32 is desired to be changed, operation is different depending on which facility information in the table of FIG. 3 is to be updated. When the response time is to be changed, the building-facility-information storage 101 is updated, and the data-request transmitting schedule is updated by the process shown in step S113 of FIG. 7.

When the data size of the scheduled building facility 32 is to be changed, after the building-facility-information storage 101 is updated, changes are made in the building-side communicating-device communication-schedule storage 107 and the information-collecting-device communication-schedule storage 108 to appropriately update the values of the communication load in the time periods in which the corresponding process data is to be collected. In that process, if the communication load after the update exceeds the permissible communication load, the update of the data size is a failure. In that case, the corresponding building facility 32 is once deleted from the schedule and added again to the schedule in the state in which the data size is updated. If the scheduling still fails, the data size cannot be changed.

When the acquisition cycle of the scheduled building facility 32 is to be changed, it is difficult to carry out update while maintaining the existing schedule. Therefore, the building facility 32 is once deleted from the schedule, the acquisition cycle is updated, and the building facility is added to the schedule again.

Figure 9:
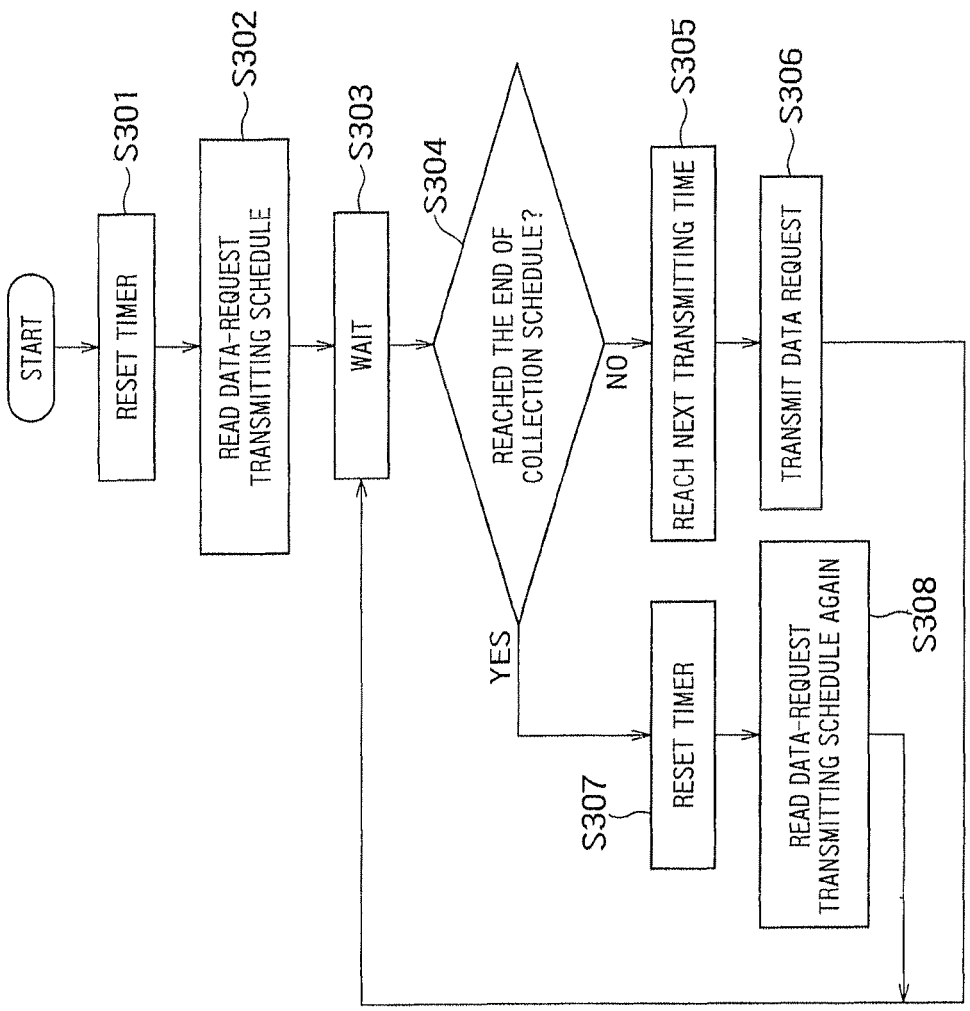
FIG. 9 is a flow chart for explaining an operation of collecting process data by a network communicating unit in accordance with a collection schedule in the first embodiment.

The operations such as addition, deletion, and change of the building facility 32 in the collection schedule have been explained above. The data-request transmitting schedule generated by these operations are referenced by the network communicating unit 105, and transmission of data requesting packets is actually carried out. FIG. 9 is a flow chart showing an operation of process data collection carried out by the network communicating unit 105.

When activated, first, the network communicating unit 105 resets the timer 111 (step S301). The timer 111 provides the elapsed time from the last reset time as current time to the network communicating unit 105.

Then, the network communicating unit 105 reads the data-request transmitting schedule from the data-request transmitting-schedule storage 109 (step S302). The read schedule is temporarily saved in the network communicating unit 105.

The network communicating unit 105 references the data-request transmitting schedule read in step S302 and the timer 111 and waits until the current time becomes the next time at which a process data is to be requested or until the current time reaches the end of the collection schedule cycle (step S303).

If the current time has not reached the end of the collection schedule cycle (step S304), the network communicating unit 105 starts operating when it reaches the next time at which a process data is to be requested (step S305). In this process, the network communicating unit 105 references the read data-request transmitting schedule and acquires the list of the identifiers of the process data to be requested at the current time. The network communicating unit 105 also accesses the building-facility-information storage 101 and acquires the identifier(s) of the building-side communicating device(s) 31 to which a process data requesting packet(s) is to be transmitted. Then, the network communicating unit 105 transmits an appropriate process data requesting packet(s) to the building-side communicating device(s) 31 (step S306). When the transmission is completed, the network communicating unit 105 waits again (return to step S303).

If the current time reaches the end of the collection schedule cycle while waiting for the process data requesting time (step S304), the network communicating unit 105 resets the timer 111 (step S307). As a result, process data collection of a new collection cycle is started. Moreover, at the same time as the reset of the timer, the network communicating unit 105 reads the data-request transmitting schedule again from the data-request transmitting-schedule storage 109 (step S308). The update carried out to the data-request transmitting-schedule storage 109 during the process data collection is reflected to the network communicating unit 105 at this time.

When the building-side communicating device 31 receives the data requesting packet from the network communicating unit 105, the process data of the requested building facility 32 is returned to the information collecting device 1. The process data returned in this process may be acquired by making an inquiry to the corresponding building facility 32 at the point when the building-side communicating device 31 receives the data requesting packet, or the data stored in the building-side communicating device 31 in advance may be used. When the network communicating unit 105 receives the process data from the building-side communicating device 31, the network communicating unit adds the data to the process database 110.

In the present embodiment, the communication load is based on the data size; however, as a modification example of the present embodiment, the number of the process data may be used.

In this case, the collection schedule of the process data from the building-side communicating device is generated so that the total number of the process data received per unit period from the building-side communicating devices (third communication load) and the number of the process data transmitted by each of the building-side communicating devices per unit period (fourth communication load) are balanced among the unit periods. For example, the collection schedule is generated so that the weighted total of the maximum value of the third communication load and the maximum value of the fourth communication load of each of the building-side communicating devices is minimized or caused to be equal to or lower than a threshold value. The weight with respect to the information collecting device 1 and the building-side communicating devices 31 may be equally 1, or the weight may be changed in accordance with the devices.

In the present modification example, the permissible communication load of the building-side communicating device 31 (fourth permissible communication load) represents a maximum number of the process data permitted to be transmitted by each of the building-side communicating devices per unit period, and the permissible communication load of the information collecting device 1 (third permissible communication load) represents a maximum number of the process data permitted to be received per unit period from all of the building-side communicating devices 31. In a scheduling method using the third and fourth permissible communication load, the collection schedule can be generated so that the weighted total of the minimum value of the difference between the third permissible communication load and the above described third communication load and the minimum value of the difference between the fourth permissible communication load and the above described fourth communication load is caused to be maximized or equal to or higher than a threshold value.

Except that the substance of the communication load is changed from the data volume to the number of the data, the present modification example is similar to the embodiment described above, and the contents described above can be applied without change.

As described above, according to the present embodiment, the communication load applied to the information collecting device and all of the building-side communicating devices can be balanced in terms of time, and the communication load can be prevented from concentrating on particular time.

Moreover, even when the process data acquisition cycles required respectively for the building facilities are mutually different, a schedule that satisfies them can be generated.

Moreover, even when the process data acquisition cycles required respectively for the building facilities are mutually different, the schedule cycle can be dynamically changed so as to adapt thereto. Therefore, even if the process data acquisition cycles are not found out in advance, the building facilities can be scheduled.

Moreover, a maximum permissible value of the communication load of the information collecting device and the building-side communicating devices can be set upon generation of the collection schedule. As a result, the collection schedule by which the predetermined communication load is not exceeded in all of the devices can be generated. Moreover, if the collection schedule by which the predetermined communication load is not exceeded cannot be generated, an error is reported to the administrator of the information collecting device, and reconsideration or the like of expansion of the information collecting device or the number of the buildings serving as the collecting targets can be urged.

The present embodiment shows the example in which one process data is collected within one unit period (one minute); however, one process data may be collected over two or more unit periods.

Second Embodiment

In the first embodiment of the present invention, the time at which the process data is collected from each of the building facilities 32 is independently determined. However, in practice, the process data of a plurality of related building facilities 32 have to be collected at particular relative time in some cases. Examples of the building-facility intermediate controlling device 33 include a device that provides an upper limit on the frequency of access from the building-side communicating devices 31. In order to satisfy such a restriction, the system must schedule the acquisition time of the process data of the building facilities 32 considering the restriction given by the building-facility intermediate controlling device 33. Another example is the case in which the process data of the plurality of building facilities 32 are desired to be acquired at the same time. This is, for example, the case in which the measurements of temperature sensors on the same floor are desired to be acquired at the same time for the convenience of controlling air conditioning facilities. Also in such a case, the relative time to acquire process data among the plurality of the building facilities 32 has to be defined.

In view of the above requirements for the information collecting device 1, in the present embodiment, relative acquisition time among a plurality of process data is set, and a collection schedule satisfying that can be generated. The overall configuration of a remote information collecting system in the present embodiment is the same as that of FIG. 1; therefore, illustration and explanation thereof will be omitted. However, in the present embodiment, the information collecting device 1 of FIG. 1 is replaced by an information collecting device 1a.

Figure 10:
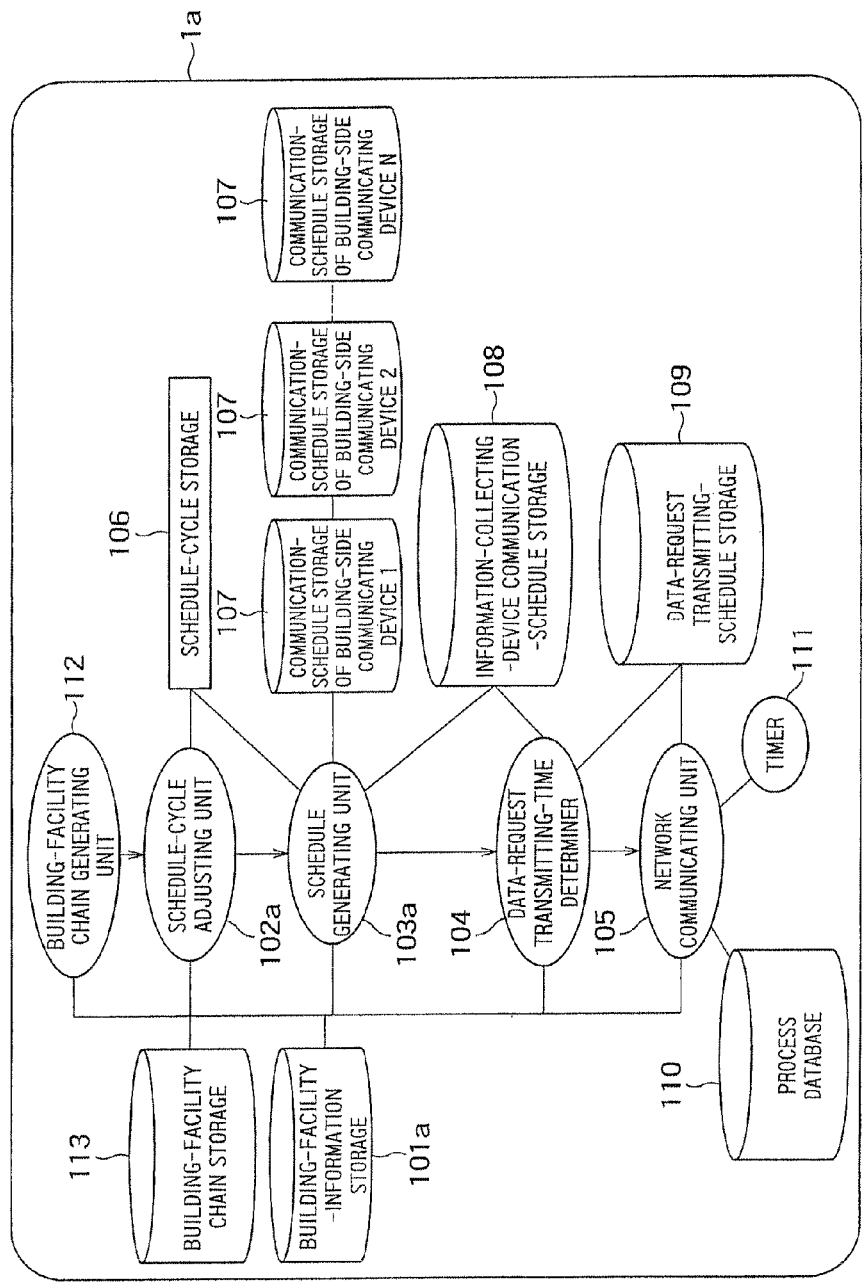
FIG. 10 is an internal configuration drawing of an information collecting device in a second embodiment.

FIG. 10 shows an internal configuration of the information collecting device 1a in the present embodiment. In the present embodiment, compared with the configuration of the first embodiment shown in FIG. 2, a building-facility chain generating unit 112 and a building-facility chain storage 113 are added, the building-facility-information storage 101 is replaced by a building-facility-information storage 101a, the schedule-cycle adjusting unit 102 is replaced by a schedule-cycle adjusting unit 102a, and the schedule generating unit 103 is replaced by a schedule generating unit 103a. Since elements other than that are common in the present embodiment and the first embodiment, explanations thereof will be omitted.

The building-facility-information storage 101a stores information of restrictions about the mutual process data acquisition time of the building facilities 32 in addition to the building facility information stored in the first embodiment. FIG. 11 shows an example of the building facility information stored in the building-facility-information storage 101a. The restrictions about the mutual acquisition time of the process data are described by the information of the column of depended data identifiers and the column of relative time in the table of FIG. 11. For example, in FIG. 11, the acquisition time of the process data of the data identifier number "2" depends on the process data of the data identifier number "1". In the case of this example, the process data of the data identifier number "2" has to be acquired one minute after the process data of the data identifier number "1" is acquired. Similarly, the process data of the data identifier number "4" has to be acquired at the same time as the process data of the data identifier number "2" and, therefore, has to be acquired one minute after the process data of the data identifier number "1". The data identifier number "1" per se does not depend on any other process data; therefore, "NULL" indicating this fact is described in the column of the depended data identifiers. Even in this case, restrictions on the acquisition time among the process data may be generated as a result of the dependence imposed thereon by other process data (for example, the data of the data identifier number "2").

The building-facility chain generating unit 112 references the building-facility information storage 101a and generates a data structure called a building-facility chain. The building-facility chain is a data structure in which the building facilities 32 having restrictions about the relative acquisition time are arranged and controlled on a time axis. In the present embodiment, the acquisition time is determined not for each process data, but determined for each building-facility chain. The process data acquisition time of the building facilities 32 contained in the building-facility chain is relatively determined by the restrictions with respect to acquisition starting time of the building-facility chain. Therefore, when the acquisition starting time of a building-facility chain is determined, the process data acquisition time of all of the building facilities 32 contained therein is determined. When the building-facility chain is built in advance in the form that satisfies the restrictions of the process data acquisition time mutually between the building facilities, scheduling that satisfies the restrictions can be carried out. Note that, if a building facility 32 has no restriction at all with other building facilities 32 regarding the process data acquisition time, a building-facility chain containing only this building facility 32 is generated.

The building-facility chain storage 113 stores building-facility chains generated by the building-facility chain generating unit 112. FIG. 12 shows an example of the information stored in the building-facility chain storage 113 generated based on the building-facility information described in FIG. 11. In the table of FIG. 12, the column of building-facility chain identifiers shows identifiers uniquely distinguishing building-facility chains, and the column of building-facility chain cycles shows the cycles by which the entire building-facility chains are acquired. In the remaining columns of data identifiers and relative-acquisition time, the data identifiers of the building facilities 32 contained in the building-facility chains and relative acquisition time thereof are stored, respectively. In FIG. 11, the restrictions are imposed on the acquisition time of the process data for the data identifiers of the number "1", the number "2", and the number "4". Therefore, a building-facility chain containing these process data is generated by the building-facility chain generating unit 112 and stored in the building-facility chain storage 113 as a building-facility chain identifier number "1". The relative acquisition time is relative acquisition time using the acquisition starting time of the building-facility chain as a starting point, which can be set to arbitrary time. In the example of FIG. 12, the value of the relative acquisition time is set with the starting point being the earliest time of process data acquisition among the building facilities 32 contained in the building-facility chain. Note that the process data acquisition cycles of the building facilities 32 in the same building-facility chain have to be equal to each other. Otherwise, the relative time of the acquisition time cannot be defined.

The schedule-cycle adjusting unit 102 in the first embodiment adjusts the schedule cycle in accordance with the acquisition cycles of the process data. On the other hand, the schedule-cycle adjusting unit 102a in the present embodiment adjusts the schedule cycle in accordance with the acquisition cycles of the building-facility chains stored in the building-facility chain storage 113. The method of adjustment is the same in the first embodiment and the present embodiment.

The schedule generating unit 103a in the present embodiment determines the acquisition starting time of the building-facility chains stored in the building-facility chain storage 113. The method for determining the time is approximately similar to that of the schedule generating unit 103 in the first embodiment. When a building-facility chain is added to the schedule, the acquisition time that balances the communication load applied to the information collecting device 1a and the building-side communicating devices 31 is selected. If the communication load applied to the information collecting device 1a or the building-side communicating device 31 exceeds the permissible communication load in any case, the schedule generating unit 103a stops the schedule generating process and reports an error to the administrator of the information collecting device 1a. When the acquisition starting time of the building facility chain is determined, the schedule generating unit 103a calculates the process data acquisition time of the building facilities 32 contained in the building-facility chain. The process data acquisition time is calculated as a result of adding the value of the relative acquisition time of FIG. 12 to the acquisition starting time of the building-facility chain. When the individual process data acquisition time is calculated, the building facility 32 in the building-facility chain is added to the building-side communicating-device communication-schedule storage 107 and the information-collecting-device communication-schedule storage 108 like the first embodiment.

Figure 13:
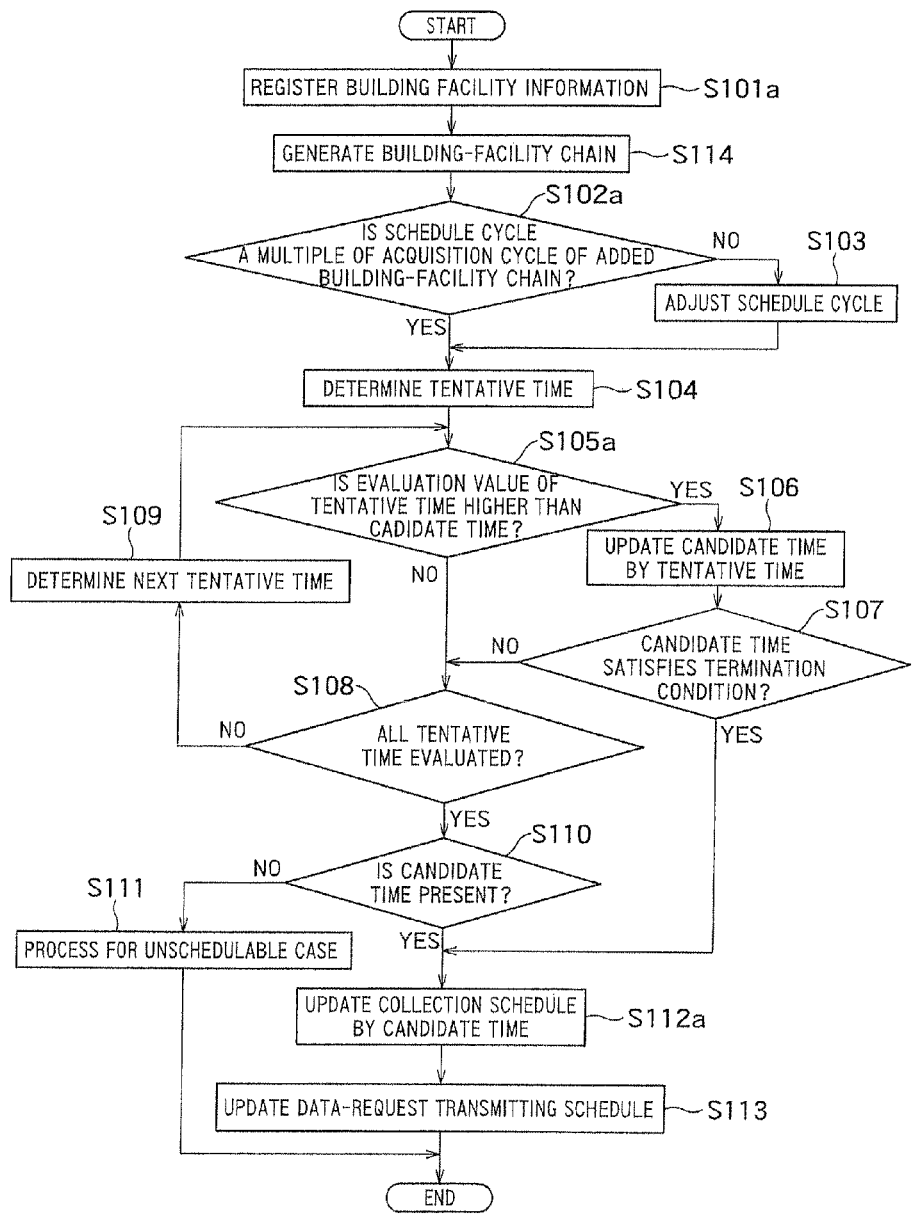
FIG. 13 shows a flow chart for explaining an operation of the information collecting device when building facilities constituting a new building-facility chain is to be added to schedule in the second embodiment.

Next, an operation of the information collecting device 1*a* in the present embodiment will be explained by using the flow chart of FIG. 13. This flow chart shows the operation in the case in which a plurality of building facilities 32 constituting a new building-facility chain are added to the building, which is already serving as the collecting target, and the process data thereof are added to the collection schedule. This flow of the operation is approximately the same as the flow of the operation of the case in which the building facility 32 is added, as explained by using FIG. 7 in the first embodiment. Therefore, hereinafter, differences between the present embodiment and the first embodiment will be mainly explained, and the explanation of the other parts will be appropriately omitted.

First, the information of the added new building facilities 32 is registered in the building-facility information storage 101*a* (step S101*a*). The information registered herein includes the information of the depended data identifiers and the relative time present in FIG. 11.

The building-facility chain generating unit 112 references the information of the building facilities 32 registered in the building-facility information storage 101*a* and generates a building-facility chain (step S114). The newly generated building-facility chain is added to the building-facility chain storage 113. Herein, one building-facility chain is newly generated. If a plurality of building-facility chains are generated, the steps hereafter are repeated for each of the building-facility chains.

The schedule-cycle adjusting unit 102*a* references the acquisition cycle of the added building-facility chain and the schedule cycle and checks whether the schedule cycle is a multiple of the acquisition cycle of the newly collected building-facility chain or not (step S102*a*). If it is not the multiple, the schedule cycle is adjusted by a process similar to that of the first embodiment (step S103).

When the adjustment of the schedule cycle is finished, a process of determining the acquisition starting time of the building-facility chain is carried out by the schedule generating unit 103*a*. Similar to the operation of the schedule generating unit 103 in the first embodiment, the acquisition starting time of the building-facility chain is tentatively set, and the communication load applied to the information collecting device 1*a* and the relevant building-side communicating devices 31 at the tentative time is evaluated. The evaluation of the communication load is carried out while changing the tentative time, and the one at which the evaluation value is the highest is stored as candidate time (step S104 to step S110).

In step S105*a*, the schedule generating unit 103*a* carries out evaluation of the tentative time. Herein, different building-side communicating devices 31 may control different building facilities in the building-facility chain. In that case, a calculating method of an evaluation value that takes the communication load of all of these building-side communicating devices 31 into consideration is required. This evaluation value can be calculated, for example, by adding the increments of communication load maximum values of the information-collecting device 1*a* and all of the building-side communicating devices 31 related to the building-facility chain or by adding the remaining communication capacity thereof.

If candidate time is present at the point when the search for the tentative time is finished, the building-facility chain is added to the schedule by the candidate time (step S112*a*). The building-facility chain can be added to the schedule by adding the building facilities 32 contained in the building-facility chain one by one to the schedule. In that process, the value obtained by adding the value of the candidate time to the value of the relative acquisition time of the table of FIG. 12 is used as the process data acquisition time of each of the added building facilities 32.

When the building-facility chain is added to the schedule and the building-side communicating-device communication-schedule storage 107 and the information-collecting-device communication-schedule storage 108 are updated, the data-request transmitting-time determiner 104 references the information and updates the data-request transmitting schedule (step S113). This process is the same as that described in the first embodiment.

Figure 14:
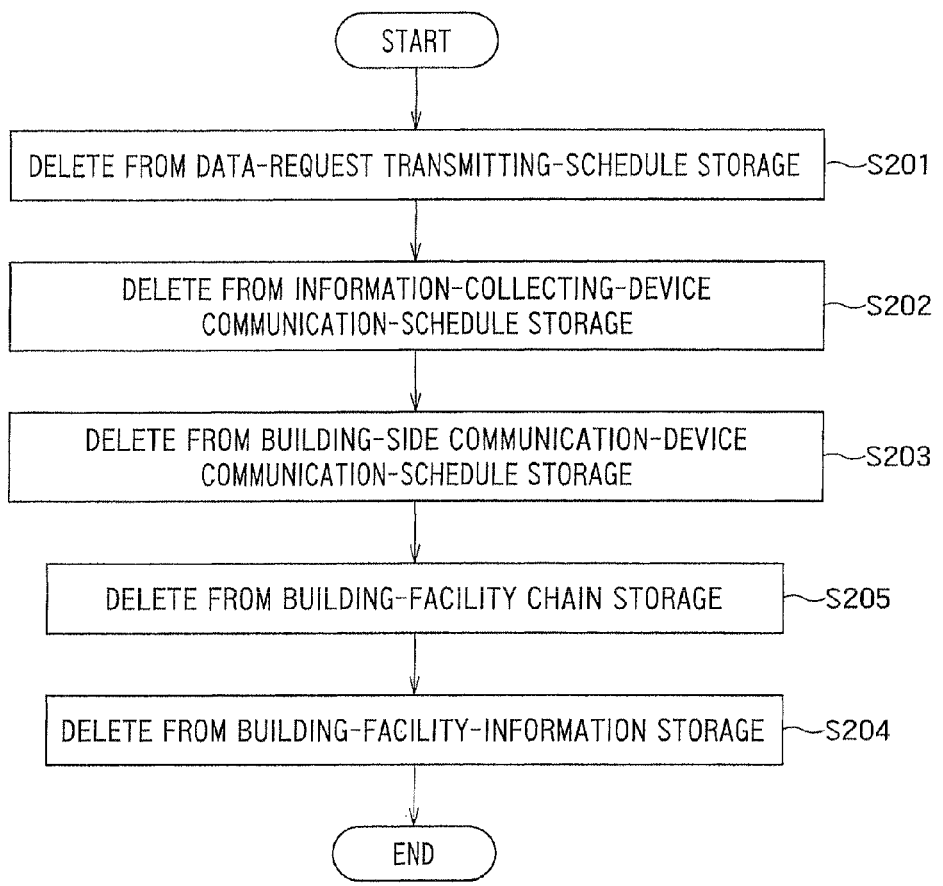
FIG. 14 is a flow chart for explaining an operation of the information collecting device when the building facility is to be deleted from the schedule in the second embodiment.

The operation of the case in which the building facilities 32 is added has been explained above. A flow of the operation of the case in which the building facility 32 is deleted from the schedule is shown in FIG. 14. Most of this operation is the same as that explained in the first embodiment (FIG. 8). A point different between the present embodiment and the first embodiment is that, in the present embodiment, the corresponding building facility 32 is deleted (step S205) from the building-facility chain storage 113 before the building-facility-information storage 101*a* is updated. In this process, the row containing the data identifier of the corresponding building facility 32 in the table of FIG. 12 is deleted.

When the information of the scheduled building facility 32 is to be changed, it can be changed by a procedure similar to that of the first embodiment as long as the changing target is the response time or data size thereof. If the changing target is any of the acquisition cycle, depended data identifier, and relative time of the table of FIG. 11, all of the building facilities 32 contained in the building-facility chain containing the corresponding building facility 32 is deleted and added again to the schedule. If the depended data identifier is changed to another building facility 32, the building-facility chain containing that building facility 32 has to be re-scheduled as well.

The data-request transmitting schedule is generated by various operations explained above. Based on the generated data-request transmitting schedule, the network communicating unit 105 communicates with the building-side communicating devices 31 and collects the process data. The flow of this operation is the same as that of the first embodiment (FIG. 9).

According to the present embodiment hereinabove, even if restrictions are imposed on the process data acquisition time of mutually different building facilities, the process data collection satisfying them can be carried out.

The invention claimed is:
1. A remote information collecting device which collects process data from each of a plurality of building-side communicating devices, comprising:
   a building-facility information storage configured to store data sizes of the process data to be collected from the building-side communicating devices;
   a computer for controlling the remote information collecting device to generate a collection schedule of the process data from the building-side communicating devices so that, in a collection period including a plurality of unit periods continuous in terms of time, a first communication load representing a total data volume received from the building-side communicating devices in each of the unit periods is equal to or lower than a first permissible communication load, second communication loads each representing a data volume transmitted from each of the building-side communicating devices in each of the unit periods are equal to or lower than second permissible communication loads, and a plurality of process data are simultaneously collected from one or more building-side communicating devices in at least one of the unit periods and to collect the process data from the building-side communicating devices in accordance with the collection schedule, wherein the collection schedule is generated so that a weighted total of a minimum value of a difference between the first permissible communication load and the first communication load and minimum values of differences between the second permissible communication loads and the second communication loads is maximized or equal to or higher than a threshold value.

2. The device according to claim 1, wherein the building-facility information storage stores information to specify response time required from when an acquisition request of each of the process data is transmitted to one of the building-side communicating devices corresponding to each of the process data until each of the process data is received;

the computer further controls the remote information collecting device to determine transmitting time of the acquisition request of each of the process data in accordance with the information and the collection schedule and transmit the acquisition request of each of the process data at the time determined by the time determiner and receive each of the process data from one of the building-side communicating devices corresponding to each of the process data.

3. The device according to claim 1, wherein the building-facility information storage contains information of acquisition cycles of respective process data;

the collection period is a common multiple of the acquisition cycles of the respective process data; and the collection schedule is executed in each of collection periods.

4. The device according to claim 1, wherein the building-facility information storage contains a restriction of acquisition time among the process data; and the collection schedule is generated so as to satisfy the restriction.

5. The device according to claim 1, wherein each one of the process data is collected within any one of unit periods.

6. The device according to claim 1, wherein the computer further controls the remote information collecting device to generate the collection schedule so that the process data are collected simultaneously from two or more building-side communicating devices.

7. A remote information collecting device which collects process data from each of a plurality of building-side communicating devices, the remote information collecting device comprising a computer for controlling the remote information collecting device to perform operations comprising:

generating a collection schedule of the process data from the building-side communicating devices so that, in a collection period including a plurality of unit periods continuous in terms of time, a first communication load representing a total number of the process data received from the building-side communicating devices in each of the unit periods is equal to or lower than a first permissible communication load, second communication loads each representing a number of the process data transmitted from each of the building-side communicating devices in each of the unit periods are equal to or lower than second permissible communication loads, and a plurality of the process data are simultaneously collected from one or more building-side communication devices in at least one of the unit periods; and collecting the process data from the building-side communicating devices in accordance with the collection schedule, wherein the collection schedule is generated so that a weighted total of a minimum value of a difference between the first permissible communication load and the first communication load and minimum values of differences between the second permissible communication loads and the second communication loads is maximized or equal to or higher than a threshold value.

8. The device according to claim 7, further comprising a building-facility information storage configured to store information to specify response time required from when an acquisition request of each of the process data is transmitted to one of the building-side communicating devices corresponding to each of the process data until each of the process data is received, wherein the computer further controls the remote information collecting device to determine transmitting time of the acquisition request of each of the process data in accordance with the information and the collection schedule and transmit the acquisition request of each of the process data at the determined time and receive each of the process data from one of the building-side communicating devices corresponding to each of the process data.

9. The device according to claim 7, further comprising a building-facility information storage configured to store information of acquisition cycles of respective process data; wherein the collection period is a common multiple of the acquisition cycles of the respective process data; and the collection schedule is executed in each of collection periods.

10. The device according to claim 7, further comprising a building-facility information storage configured to store a restriction of acquisition time among the process data; wherein the collection schedule is generated so as to satisfy the restriction.

11. The device according to claim 8, wherein each one of the process data is collected within any one of unit periods.

12. The device according to claim 7, wherein the computer further controls the remote information collecting device to generate the collection schedule so that the process data are collected simultaneously from two or more building-side communicating devices.

13. A non-transitory computer readable medium storing a computer program which, when executed by a computer to collect process data from each of a plurality of building-side communicating devices, causes the computer to perform steps comprising:

accessing a building-facility information storage configured to store data sizes of the process data to be collected from the building-side communicating devices;

generating a collection schedule of the process data from the building-side communicating devices so that, in a collection period including a plurality of unit periods continuous in terms of time, a first communication load representing a total data volume received from the building-side communicating devices in each of the unit periods is equal to or lower than a first permissible communication load, second communication loads each representing a data volume transmitted from each of the building-side communicating devices in each of the unit periods are equal to or lower than second permissible communication loads, and a plurality of the process data are simultaneously collected from one or more building-side communication devices in at least one of the unit periods; and collecting the process data from the building-side communicating devices in accordance with the collection schedule, wherein the collection schedule is generated so that a weighted total of
- a minimum value of a difference between the first permissible communication load and the first communication load and
- minimum values of differences between the second permissible communication loads and the second communication loads is maximized or equal to or higher than a threshold value.

14. A non-transitory computer readable medium storing a computer program which, when executed by a computer to collect process data from each of a plurality of building-side communicating devices, causes the computer to perform steps comprising:

generating a collection schedule of the process data from the building-side communicating devices so that, in a collection period including a plurality of unit periods continuous in terms of time, a first communication load representing a total number of the process data received from the building-side communicating devices in each of the unit periods equal to or lower than a third permissible communication load, second communication loads each representing a number of the process data transmitted from each of the building-side communicating devices in each of the unit periods are equal to or lower than second permissible communication loads, and a plurality of the process data are simultaneously collected from one or more building-side communication devices in at least one of the unit periods; and collecting the process data from the building-side communicating devices in accordance with the collection schedule, wherein the collection schedule is generated so that a weighted total of
- a minimum value of a difference between the first permissible communication load and the first communication load and
- minimum values of differences between the second permissible communication loads and the second communication loads is maximized or equal to or higher than a threshold value.

* * * * *